UNITED STATES PATENT OFFICE.

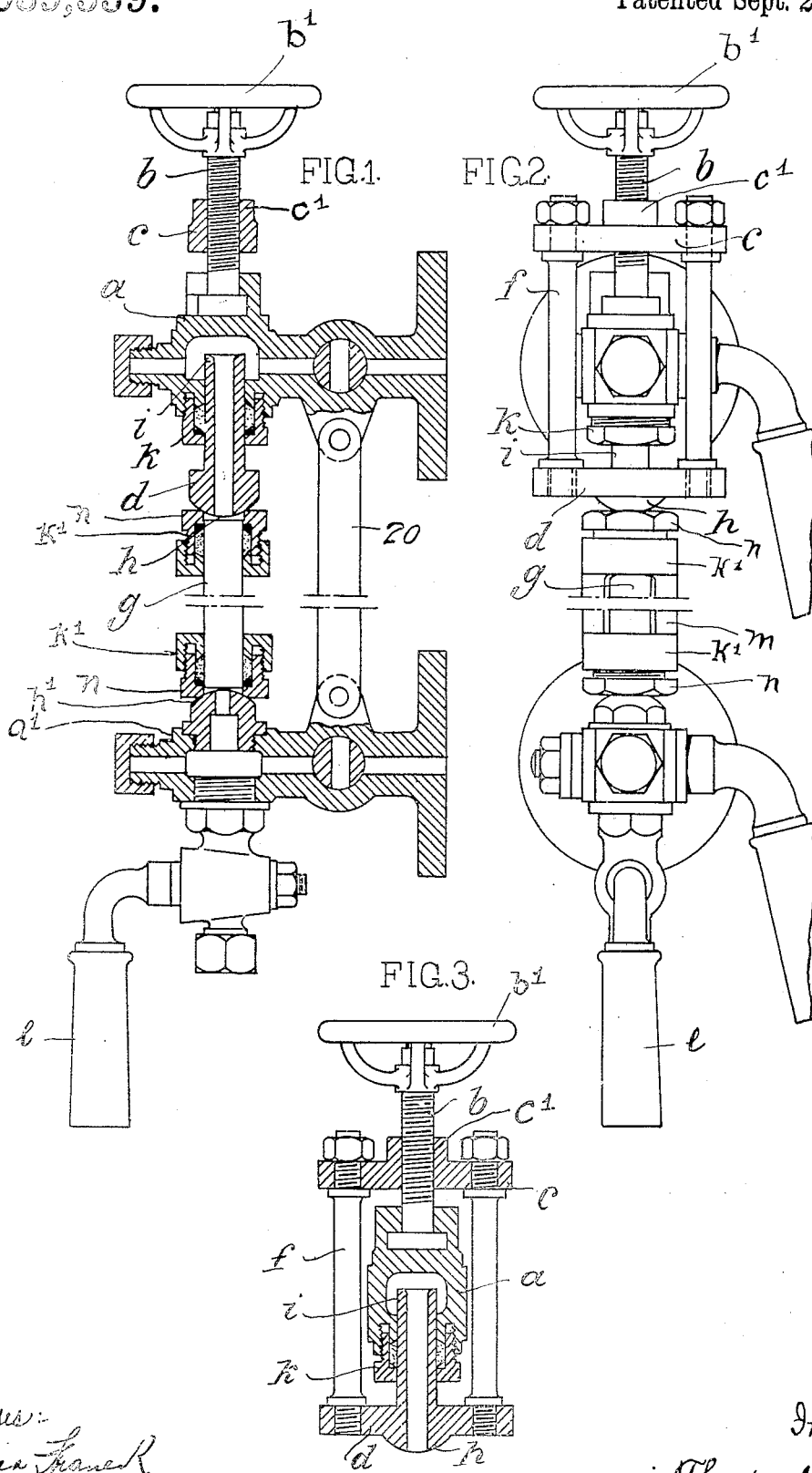

THEODOR MAAS, OF BERLIN-GRUNEWALD, GERMANY.

GAGE-GLASS FOR BOILERS AND THE LIKE.

1,039,559.  Specification of Letters Patent.  Patented Sept. 24, 1912.

Application filed October 11, 1909. Serial No. 522,152.

*To all whom it may concern:*

Be it known that I, THEODOR MAAS, a citizen of the German Empire, residing at Berlin-Grunewald, Germany, have invented certain new and useful Improvements in Gage-Glasses for Boilers and the Like; and I do hereby declare the following to be a full, clear, and exact description of the invention, such as will enable others skilled in the art to which it appertains to make and use the same.

This invention relates generally to gage-glasses for boilers and the like, and more particularly it refers to means whereby such gage-glasses may be quickly removed from, and replaced in, the bearings supporting the glasses, without danger to the operator from burning or scalding.

The invention is especially applicable to gage glasses held in a frame between upper and lower curved bearings, usually formed on the end of screw spindles whereby the bearing surfaces may be moved toward or from the ends of the glass, and in this class of devices it is old in the art to project the upper spindle through the upper gage cock, and provide such spindle with a hand wheel whereby the bearing surface may be moved against and away from the gage-glass. In a structure of this character it is necessary, however, to use an additional stuffing box for the upper spindle, and owing to the close proximity of the hand wheel to the gage cock the former becomes very hot and hard to handle.

It is the principal object of the present invention to obviate the difficulties above referred to as inhering in present forms of such devices, and I accomplish this object by providing a cheap, simple and efficient structure wherein one of the bearing surfaces, preferably the upper one, is secured to, or integrally formed with a reciprocable frame which is associated with, and movable relatively to, one of the gage cocks. By the use of a device so constructed, the gage-glass may be quickly removed and the operator relieved from any danger of burning or scalding.

The form of invention at present preferred by me is illustrated in the accompanying drawing, wherein—

Figure 1, is a vertical sectional view of a boiler fitting having a gage-glass provided with my invention; Fig. 2 is an elevational view thereof; and Fig. 3 is a vertical sectional detail view.

Referring by reference numerals to the several figures of the drawing, $a$ and $a^1$ designate the gage-cocks of an ordinary steam boiler (not shown) communicating respectively, with the steam space and the water space of the boiler and $l$ represents the drip cock used for draining purposes. The gage glass $g$ which is of the ordinary construction and open at both ends communicates with both cocks $a$ and $a^1$, communication being established through bored bearings $h$ and $h^1$, associated respectively with the cocks $a$ and $a^1$. The bearings are preferably curved at the surfaces where the gage-glass contacts against the same, and the bearing $h$ has an extension $i$ passing through a stuffing box $k$ into the steam chamber of the cock $a$. Projecting upwardly from the cock $a$ is a screwed spindle $b$ provided with a hand wheel $b^1$, and embracing the spindle is a collar $c^1$ which is formed as part of a yoke $c$, constituting one member of a preferably rectangular frame which includes said yoke $c$, a second yoke $d$ and side uprights $f$ $f$. The yoke $d$ has formed integrally therewith the gage-glass-bearing $h$.

The gage-glass $g$ is held in a frame $m$, the upper and lower ends of which are formed as stuffing boxes $k^1$, a bored nut $n$ being designed to engage the curved surfaces of the bearings $h$ and $h^1$.

Attached to each of the cocks $a$ and $a^1$ is one end of a connecting bar 20 by means of which the two cocks are interconnected. If no such bar were provided the cocks might be moved apart and out of alinement when the gage glass is clamped in position by turning of the threaded stem $b$. By the employment of the bar 20, the latter is caused to take up the pressure or pull resulting from the operation of the stem $b$, and thus prevent deformation or damage to the parts when the stem $b$ is screwed down to tightly clamp the gage glass and its frame in position between the bearings therefor.

The operation of the invention will be understood from the following description thereof:—When it is desired to remove the gage-glass $g$, the hand wheel $b^1$ is turned in the proper direction to feed the collar $c^1$ upwardly on the screw, thus raising the frame $c$, $d$, $f$ and lifting the bearing $h$ from the gage-glass which may be removed with its frame $m$. When the glass is to be replaced the frame with the glass are put back in position where the glass is in alinement with the bores in the bearings $h$ and $h^1$ and the hand wheel again turned to clamp the bearing $h$ down in position on the upper nut $n$ and the bearing $h^1$ on the lower nut $n$. The removal and replacement of the glass may be quickly effected and the operator need not come into contact with any excessively hot parts of the apparatus.

Having thus described my invention what I claim as new and desire to secure by Letters Patent is:—

1. In a device of the character described, the combination of a pair of gage cocks, a gage-glass-bearing-member fixed in one of said cocks, said member being longitudinally bored and presenting a curved bearing surface, a threaded stem revoluble in the other cock and in axial alinement with both said cocks, means by which said stem may be revolved, a frame independent of the cock having the fixed gage-glass-bearing-member and having a portion embracing said stem whereby the frame may be raised and lowered by revolution of said stem, said frame having its lower bar formed as a curved gage-glass-bearing-member provided with a bored elongation projecting into the steam chamber of the cock with which it is associated, a stuffing box carried by said last named cock and through which the said elongation is adapted to extend, and a second frame adapted to carry a gage glass and designed to be clamped between and removed as an entirety from the said gage-glass-bearing-members.

2. In a device of the character described, the combination of an upper and a lower gage cock, a bar by which said cocks are connected, a gage-glass-bearing-member fixed in the lower cock, said member being longitudinally bored to afford communication with the inner chamber of the cock and presenting a curved bearing surface, a threaded stem revoluble in the upper cock and in axial alinement with both cocks, means by which said stem may be revolved, a frame independent of the lower cock and having a portion embracing said stem whereby the frame may be raised and lowered by revolution of said stem, the lower bar of said frame being formed as a curved gage-glass-bearing-member in alinement with the member fixed in the lower cock, said bearing-member in the upper cock being longitudinally bored and provided with a bored elongation projecting into the steam chamber of the cock with which it is associated, a stuffing box carried by said last named cock and through which the said elongation is adapted to extend, a second frame adapted to carry a gage glass and designed to be clamped between and removed as an entirety from the said gage-glass-bearing members, and a stuffing-box at each end of said last named frame wherein the gage-glass is held.

In testimony whereof I have hereunto affixed my signature in the presence of two witnesses.

THEODOR MAAS.

Witnesses:
WOLDEMAR HAUPT,
HENRY HASPER.